Nov. 11, 1958   I. L. MENDENHALL   2,859,898
CONTAINER AND A CAP THEREFOR, BY MEANS OF WHICH A USER CAN
PREPARE A FRESH SOLUTION OR SUSPENSION AND
CAN READILY DISPENSE THE SAME

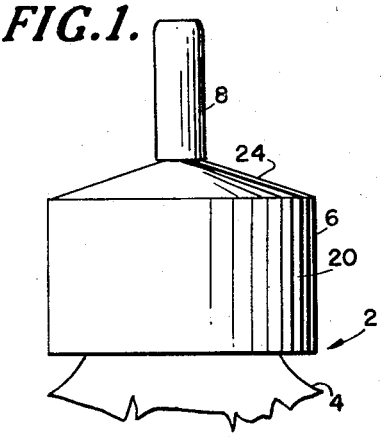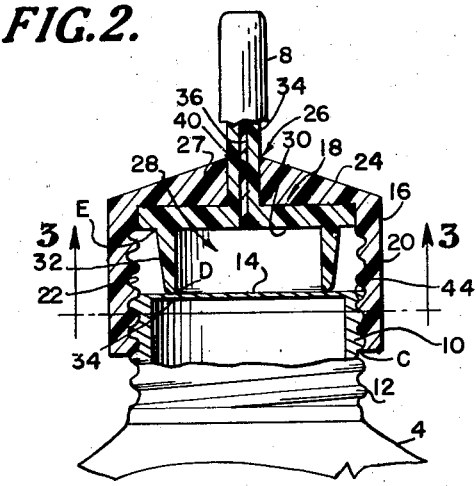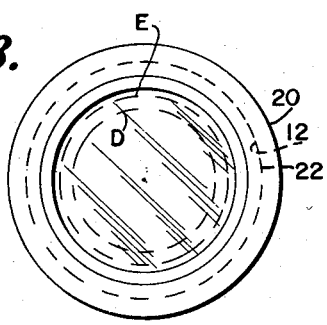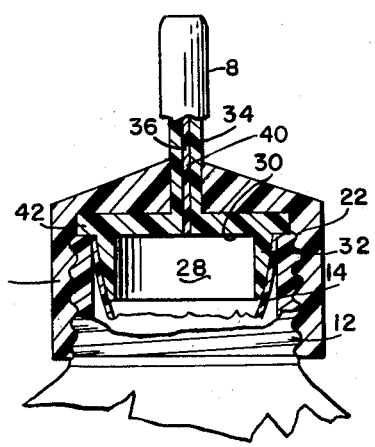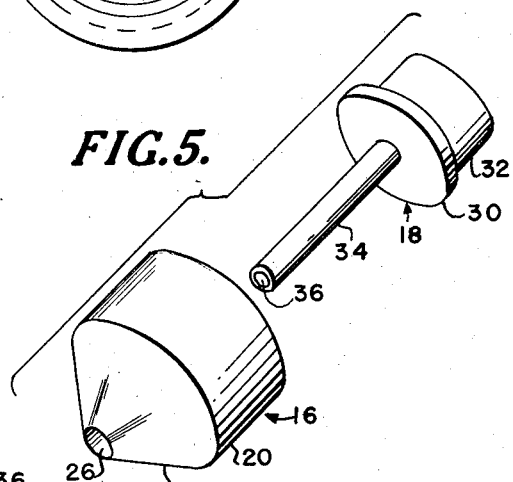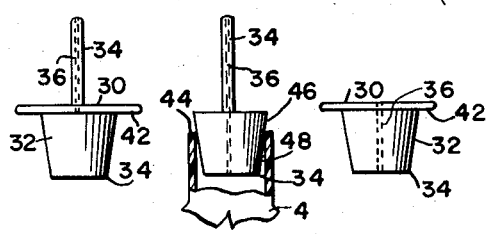

Filed Oct. 3, 1956   2 Sheets-Sheet 2

INVENTOR

IVAN MENDENHALL

BY
Cushman, Darby & Cushman
ATTORNEYS

2,859,898
Patented Nov. 11, 1958

2,859,898

CONTAINER AND A CAP THEREFOR, BY MEANS OF WHICH A USER CAN PREPARE A FRESH SOLUTION OR SUSPENSION AND CAN READILY DISPENSE THE SAME

Ivan L. Mendenhall, St. Joseph, Mo., assignor to Research Laboratories, Inc., St. Joseph, Mo., a corporation of Missouri Application October 3, 1956, Serial No. 613,675

12 Claims. (Cl. 222—1)

This application is a continuation-in-part of application Serial No. 551,104, filed December 5, 1955, now abandoned.

The present invention relates to containers and a cap therefor, by means of which a user can prepare a fresh solution or suspension and can readily dispense the same.

Many drugs, dyes and other chemicals are frequently supplied in powder or crystal form and do not retain their stability, strength and effectiveness for long after they have been mixed in solution or suspension, a condition frequently necessary in their administration or other use. Thus, for example, it is desirable to keep drugs, such as penicillin or novocain, dry and to admix them with the solvent immediately before use. Similarly, modified live hog cholera vaccine, such as rabbit modified, porcine-produced live hog cholera vaccine, is normally quick frozen, e. g. at 70° C., and maintained under vacuum until dried to less than 2% by weight of water, sealed under vacuum in the bottle and then a sterile diluent, e. g., water, is added immediately before injection into the animal to reconstitute the vaccine. Likewise, it is important to keep certain synthetic resins and their curing catalysts separate until immediately before use in order to prevent premature curing. For example, it is conventional to make melamine-formaldehyde adhesives by admixing a spray-dried melamine-formaldehyde condensation product, e. g., as made in Example 1 of Widmer Patent No. 2,318,121, with an aqueous solution of an acid catalyst, such as oxalic acid or ammonium sulfate. Thus, 100 parts of the resin can be mixed with a solution of 1 part of oxalic acid in 60 parts of water or 5 parts of ammonium sulfate in 45 parts of water.

What has been said in regard to melamine formaldehyde is equally applicable to urea-formaldehyde condensation products and other curable resins.

It is also important that admixtures of the various chemicals be done under conditions wherein a measured amount of one chemical be added to a measured amount of the other chemical to insure that proper results are obtained with a minimum of waste.

Accordingly, it is an object of the present invention to provide a package for storing, mixing and dispensing a plurality of chemicals with a minimum of time and effort.

An additional object is to provide a novel container cap suitable for use as a reservoir for a chemical.

Another object is to provide a novel package for storing, mixing and then dispensing chemicals with little or no danger of contamination.

A further object of the invention is an improved method of storing, mixing and then dispensing chemicals.

Yet another object is to provide a novel combination of a container with a storage and dispensing cap wherein uniform admixture of the contents of the cap and of the container is assured.

Still another object is to provide a two-piece container cap which can be utilized to store a chemical and which can be produced economically.

Other and further important objects of the present invention will become apparent from the following description taken in connection with the accompanying drawings wherein:

Figure 1 is a fragmentary front elevation of the container, cap and closure for the cap;

Figure 2 is a fragmentary vertical section of the container, cap and closure, showing a preferred form of the invention wherein the cap is made in two sections. The cap in Figure 2 is in a raised seal-engaging position;

Figure 3 is a horizontal section on the line 3—3 in Figure 2;

Figure 4 is a fragmentary vertical section similar to Figure 2, but showing the cap in a lowered seal-breaking position;

Figure 5 is an exploded perspective view of the two-piece cap shown in Figure 2;

Figure 6 is a front elevation of the inner member of the two-piece cap of Figure 5 and employed in the preferred form of the invention;

Figure 7 is a front elevation of an alternative type of inner member of a two-piece cap;

Figure 8 is a front elevation of still another type of inner member of a two-piece cap;

Figure 9:
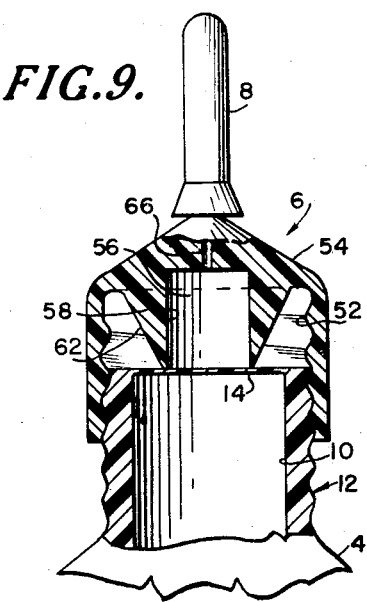
Figure 9 is a fragmentary vertical section of an alternative form of the container, cap and closure wherein the cap is unitary. The cap in Figure 9 is in a raised seal-engaging position.

Referring to the drawing by reference characters, the invention is shown as embodied in a package, indicated generally at 2. The package includes a container 4, a cap 6 and a closure or tip cover 8 (Figure 9).

The container can be made of glass, metal, e. g., steel and tinplate, plastic, e. g., polyethylene, polystyrene, polymerized methyl methacrylate, cellulose acetate, phenyl-formaldehyde, melamine-formaldehyde resin, etc., or other conventional material. The cap can similarly be made of any material, although preferably the cap should be made of a different material from the container. The container 4 which can be of unitary construction, for example, has a neck 10 having external threads 12. The container 4 is filled with a vehicle, diluent, solvent or powder and then a thin sealing film 14 is applied across the top of the neck to completely seal the container. The sealing film can be of conventional material, such as metal, e. g., aluminum, or plastic, e. g., cellophane, polyethylene, vinylidene chloride resin-coated polyethylene, rubber hydrochloride, Saran (vinylidene chloride resin), polyethylene terephthalate (Mylar), etc.

In the preferred form of the invention as shown in Figure 2, the cap 6 is made in two sections, an outer member 16 and an inner member 18. The outer member has an annular skirt portion 20 having internal threads 22 adapted to engage the external threads 12 of the neck of the container. The skirt portion 20 of the cap terminates in an end portion 24. A central aperture 26 is provided in the end portion. The outer member 16 is generally cylindrical in shape with the end portion being frustoconical. Internally the member 16 is cylindrical and terminates in a flat end 27.

Inner member 18 comprises a reservoir or cup 28. The cup is defined by an end wall 30 and a depending recessed skirt 32. The skirt 32 terminates in a lower and preferably sharp cutting or film penetrating edge 34. The skirt 32 is parallel to, concentric with and shorter than the threaded skirt 20 of the outer member 16 by one or two threads. End wall 30 substantially coincides with the inner dimensions of end wall 27 and forms a sliding fit with skirt 20. End wall 30 terminates in a central elongated tip 34 having a narrow opening 36 therein which communicates directly with the reservoir 28 and serves as a dispenser. The tip is covered by a closure or tip cover 8. The tip cover has a stem portion 40 tightly fitting in opening 36 and extending substantially the entire length thereof for a reason which will be explained later. The tip 34 is in tight sliding engagement with the walls of the aperture 26 in the end 24 of the outer member.

With the tip cover 8 in place, the cap 6 is placed in an inverted position and the reservoir 28 is filled with the chemical desired to be stored and later mixed with the substance in container 4. With the cap still in inverted position, the container is inverted and the cap (or the container) rotated in the proper direction and tightened until the edge 34 is flush with the seal 14 of the container as shown in Figure 2. The contents of the reservoir 28 thus are confined and prevented from spilling and the package can then be turned to an upright position. When it is desired to admix the contents of the reservoir 28 in the cap with the contents of the container, the cap is further rotated and tightened permitting penetration and breakage of the seal 14 on container 4, as shown in Figure 4. The contents of the container and the reservoir can then be thoroughly admixed by shaking or other conventional means. If stem 40 were not inserted in opening 36, there would be a danger of some of the contents of the reservoir remaining in this narrow opening, thus preventing uniform admixture of the contents of the reservoir and the container.

The admixed contents can be dispensed through the opening 36 by removal of tip cover 8. The tip cover is removed by sliding the same off of the tip 34, stem 40 sliding out through opening 36. If it is desired to keep the mixed contents for further use and free of contamination or loss of volatile components, the tip cover is again inserted in place. This also serves the advantage of preventing materials from drying out and clogging the narrow opening.

The package of the present invention can be used, for example, with penicillin, in the reservoir and a solvent, e. g., water, in the container or it can be used with novocain in the reservoir and a solvent in the container. Similarly, it can be used with the previously described dessicated hog cholera vaccine in the reservoir and water in the container. Additionally, it can be used with 100 parts of the previously described spray-dried melamine-formaldehyde resin in the reservoir and 1 part of oxalic acid in 60 parts of water in the container (all parts are by weight). Or conversely, 5 parts of ammonium sulfate dissolved in 45 parts of water can be in the reservoir and 100 parts of the spray-dried melamine-formaldehyde can be in the container ready for the subsequent admixing procedure described supra.

The flange portion 42 seats on the top end 44 of the container after the sealing film 14 is broken and this insures against any possible leakage. The elongated tip 34 also serves to aid in centering the inner member 18.

The relatively narrow and elongated opening 36 makes it easy to dispense materials from the container in a controlled manner. If the tip 34 is made of a flexible material, it is also possible to direct the discharge through the opening 36 in any desired direction. By making the container of polyethylene, it is possible to adapt the package for use as a squeeze bottle dispenser.

For such a use, for example, a tube could extend from opening 36 through the reservoir 28 and seal 14 and be of sufficient length that when the seal is broken the tube would terminate near the bottom of the container. To prevent leakage at the seal prior to breakage thereof, in this modification the sealing film could be applied to the cap after filling the reservoir, the container with the bottom open screwed onto the cap, the container filled through the bottom and the bottom closed. In fact, it is possible to make all the parts of polyethylene.

It has been found advantageous to make the cap 6 in two sections, as shown in Figures 2 and 4, as such a procedure greatly reduces molding costs, while at the same time, in no way reducing the effectiveness of the cap.

While the inner member 18 shown in Figures 2 and 6 is the presently preferred form, it is possible to modify the inner member in various ways, as is illustrated in Figures 7 and 8. Thus, the flange 42 can be omitted if the wall or skirt 46 is frustoconical, as in Figure 7. In such case, the slope of the wall 46 should be such that the cutting edge 34 comes within the container 4, but the upper portion of the wall 46 is of greater diameter than the inner diameter of the wall 48 of the container. Alternatively, in the modification shown in Figure 7, instead of the wall being frusto-conical, it can be cylindrical with a beveled bottom edge so that the inner member can seat on the upper edge 44 of the container while the beveled edge permits the breaking of the film 14. In the form of invention shown in Figure 7, the elongated tip 34 is important as an aid to centering the inner member. The tip 34 should be long enough that it will not fall through the opening 26 when the cap 6 is on the container in upright position.

It is also possible to dispense with the elongated tip 34, as is shown in Figure 8. In this case, it is important that the flange 42 extend the full inner diameter of the outer member 16 so that the end wall 30 will serve as a centering device.

Figure 10:
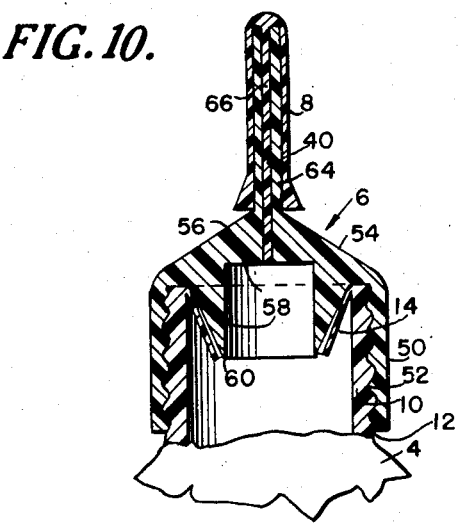
Figure 10 is a view similar to Figure 9 but showing the cap in a lowered seal-breaking position.

Instead of utilizing a two-piece cap, there can be used a one-piece cap, as shown in Figures 9 and 10.

The cap 6 has an annular skirt portion 50 having internal threads 52 adapted to engage the external threads 12 of the neck of the container. The skirt portion 50 of the cap terminates in an end portion 54. In order to form a reservoir 56 in the cap for holding a chemical for admixture with the material in the container, the cap 6 is provided with an annular inner wall 58 depending from the end portion 54 and parallel to and concentric with the skirt portion 50 of the cap and inwardly thereof and of less length than the skirt. The wall 58 is provided with a lowermost, and preferably sharp, film penetrating edge 60 formed by the outer inclined surface 62 and the inner vertical surface 58.

The end wall 20 terminates in an elongated tip portion 64 having a narrow opening 66 therein. The opening 66 is concentric with the skirt 50 and of much lesser diameter than the inner wall 58 and can even be of almost capillary diameter.

Figure 11:
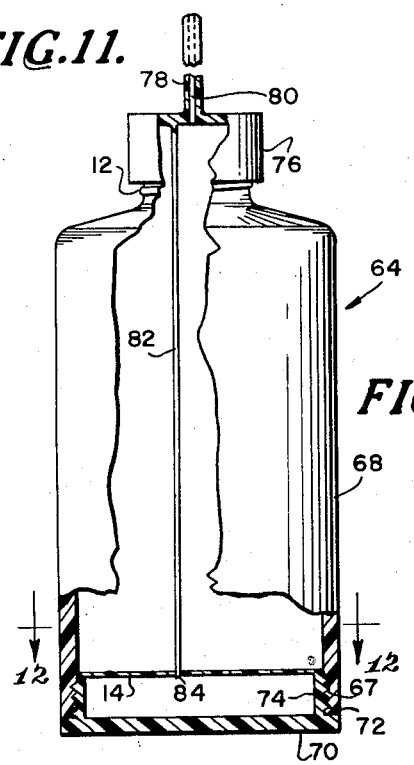
Figure 11 is a front view, partially broken away in section illustrating another form of container and cap according to the invention.
Figure 12:
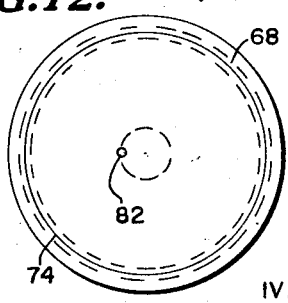
Figure 12 is a section on the line 12—12 in Figure 11.

In the form of invention illustrated in Figures 11 and 12, the container 64 has internal threads 67 at the lower end of the wall 68. The bottom closing wall 70 has an upstanding portion 74 which is threaded at 72 to form a tight seal with the wall of the container. The bottom wall 70 thus serves as a cup or reservoir which can be filled with one of the two materials it is desired to keep separate. After this cup is filled with the desired amount of material, the sealing film 14 is applied and the bottom wall is screwed into the container. The second material is then placed in the container 68 on top of the film 14 and threaded cap 76 is then screwed into position. The cap 76 has a dispensing tip 78 having an aperture 80 therein. The aperture can be closed by a cover in the manner previously set forth. Attached to the cap 76 is an inner elongated tube or solid member 82 which terminates in a cutting edge 84. Member 82 is of such a length that the cap 76 can be closed on the container without cutting edge 84 piercing the sealing film 14. However, further turning of the cap permits the cutting edge 84 to break the film 14. Sufficient threads are on the cap 76 and the threaded top of the container so that the cutting edge 84 can cut out a circle in the film 14. As shown in Figure 12, the member 82 is off center. Preferably, it is sufficiently off center to insure rapid and easy mixing of the two materials when the sealing film 14 is broken.

Figure 13:
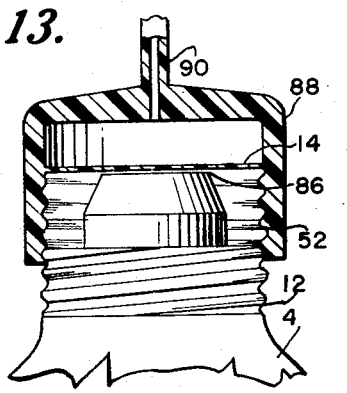
Figure 13 is a fragmentary vertical section of still another form of container and cap according to the invention.

In the form of the invention illustrated in Figure 13, the container 4 is supplied with the cutting edge 86 and the sealing film 14 is across the cap 88. The cap 88 has a dispensing elongated tip 90.

I claim:

1. A dispensing and material mixing cap for a container having an outlet and a sealing film across said outlet, said cap being provided with a threaded skirt and an end wall, a shorter inner wall concentric within the skirt and terminating in said end wall defining a reservoir for holding a substance to be mixed with material in said container, a sharp film sealing element at the end of said inner wall adapted to cut said film, an opening in said end wall concentric with said skirt and of lesser diameter than said inner wall for dispensing material when said cap is attached to a container and a closure for said opening.

2. A combination of a container and a cap adapted to hold a substance for admixture with the contents of said container and to serve as a dispenser for said admixture, said container having a hollow externally threaded end and a sealing film at the top of said threaded end, said cap being provided with an internally threaded skirt and end wall, a shorter inner wall concentric with the skirt and terminating in said end wall defining a reservoir for holding a substance to be mixed with material in said container, a sharp film cutting element at the end of said inner wall in sealing engagement with said sealing film whereby material in said reservoir cannot spill, an opening in said end wall concentric with said skirt and of lesser diameter than said inner wall for dispensing material after admixture of the substance in said cap with the contents of the container, and a closure for said opening.

3. A combination of a container and a cap according to claim 2 wherein said dispensing opening is narrow and wherein said closure has a central stem portion fitting in said opening and extending substantially the entire length thereof whereby the substance in the reservoir cap cannot enter said opening prior to admixture with the contents of said container.

4. A method of storing, mixing and dispensing a plurality of material in a container having an outlet with a sealing film thereacross and a cap with an opening and a closure for the opening and thereafter dispensing the admixture, said method comprising placing a first material in said container, inserting a second material in said cap while the cap is in an inverted position, engaging said cap in the inverted position with said container until the cap is in sealing relationship with said sealing film so that the container and cap can be stored without admixture of the contents thereof; thereafter further engaging said cap with said container in a manner to puncture said sealing film and to admix said second material in the cap with said first material in the container and then removing the closure from said cap and dispensing the admixture through said opening.

5. A combination of a container and a cap adapted to hold a substance for admixture with the contents of said container, and to serve as a dispenser for said admixture, said cap being movable between an upper position and a lower dispensing position, said container having a bottom wall, a side wall having an inner surface and an outer threaded surface, an opening having an inner diameter and a thin film extending across said opening and sealing the same, said cap comprising an outer member provided with an end wall and an interiorly threaded depending skirt, an aperture in said end wall, and a separate inner member having an end wall, a depending skirt having an inner and outer surface at an inner and outer diameter and shorter than the skirt of said outer member and defining a cup, the outer diameter of said inner skirt being greater than the inner diameter of said container top, said inner skirt terminating in a cutting means of lesser diameter than said container inner diameter, an aperture in said inner end wall overlapping with said aperture in said outer end wall to serve as a dispenser, said inner end wall being adapted to otherwise be in sealing relationship with said outer end wall when said cap is on said container in dispensing position.

6. A combination as in claim 5 wherein said end wall of said inner cap member terminates in a central, hollow stem portion which serves as said dispenser.

7. A combination as in claim 5 wherein said end wall of said inner cap member is concentric with said outer cap member and substantially coincides with the inner dimensions of said cap outer end wall and said inner member depending skirt is recessed.

8. A combination as in claim 7 wherein said end wall of said inner cap member terminates in a central, hollow stem portion which serves as said dispenser and the lower edge of said inner skirt is beveled to provide said cutting means.

9. A combination of a container and a cap adapted to hold a substance for admixture with the contents of said container and to serve as a dispenser for said admixture, said cap being movable between an upper position and a lower dispensing position, said container having a bottom wall, a side wall and an open top, said side wall terminating in a recessed upper portion, said upper portion including film cutting means, and a cap, said cap having an outer skirt and an end wall having an aperture therein, a shorter inner skirt concentric with said outer skirt and defining a reservoir open at its lower end for holding a substance to be mixed with material in said container, said reservoir having an aperture concentric with said end wall aperture, and a sealing film closing the lower end of said reservoir, said cap being adapted to be lowered on said container so that the sealing film can be cut by said film cutting means when said cap is in said dispensing position.

10. A combination of a container and a cap adapted to hold a substance for admixture with the contents of said container and to serve as a dispenser for said admixture, said cap being movable between an upper position and a lower dispensing position, said container having a cup-shaped bottom wall, a side wall and an open top, said bottom wall being in sealing relation with said side wall, said bottom wall having a sealing film across the top thereof to seal the contents thereof, said cap having an outer skirt and an end wall comprising a puncturing member of such length that it will not break said sealing film when said cap is in normal closing position on said container but that it will break said sealing film when said cap is lowered into dispensing position, one of said cap end wall and said bottom wall being provided with a dispensing aperture therein.

11. A combination as in claim 10 wherein said puncturing member comprises an eccentric stem.

12. A dispensing and material mixing cap for a container having an outlet with a sealing film thereacross, said cap comprising an outer member provided with an end wall, an internally threaded depending skirt, and a central aperture in said end wall; a separate inner member comprising an end wall substantially coinciding with the inner dimensions of said outer end wall and having a central aperture therein concentric with the opening in said outer end wall, a recessed depending skirt concentric with, and shorter than the skirt of said outer member and defining inner and outer cups, a hollow central stem portion extending upwardly from said inner end wall and through the aperture in said outer end wall when said cap is on a container in dispensing position; and a closure for said cap, said closure extending into said hollow stem.

References Cited in the file of this patent

UNITED STATES PATENTS

| | | |
|---|---|---|
| 1,925,466 | Simpson | Sept. 5, 1933 |
| 2,073,292 | Waite et al. | Mar. 9, 1937 |